US010488057B2

(12) United States Patent
Jonsson

(10) Patent No.: US 10,488,057 B2
(45) Date of Patent: Nov. 26, 2019

(54) CONTROLLING UNDER SURFACE HEATING/COOLING

(75) Inventor: Ulf Jonsson, Upplands Väsby (SE)

(73) Assignee: Uponor Innovation AB, Virsbo (SE)

(*) Notice: Subject to any disclaimer, the term of this patent is extended or adjusted under 35 U.S.C. 154(b) by 2122 days.

(21) Appl. No.: 12/742,189

(22) PCT Filed: Nov. 12, 2008

(86) PCT No.: PCT/IB2008/054731
§ 371 (c)(1),
(2), (4) Date: Aug. 31, 2010

(87) PCT Pub. No.: WO2009/063407
PCT Pub. Date: May 22, 2009

(65) Prior Publication Data
US 2011/0006125 A1 Jan. 13, 2011

(30) Foreign Application Priority Data
Nov. 15, 2007 (FI) .................................... 20070868

(51) Int. Cl.
F24D 3/12 (2006.01)
F24D 19/10 (2006.01)
G05D 23/19 (2006.01)
F24D 3/14 (2006.01)
F24D 3/02 (2006.01)
F24D 11/00 (2006.01)
F24D 9/02 (2006.01)
G05D 23/00 (2006.01)

(52) U.S. Cl.
CPC ........... F24D 19/1009 (2013.01); F24D 3/12 (2013.01); G05D 23/1934 (2013.01); Y02B 30/24 (2013.01); Y02B 30/762 (2013.01)

(58) Field of Classification Search
CPC ... F24D 3/12; F24D 3/14; F24D 3/146; F24D 3/16; F24D 3/02; F24D 7/00; F24D 10/00; F24D 11/002; F24D 19/1009; G05D 23/00
USPC .......... 126/69; 237/69, 12, 8 A, 2 A, 59, 62, 237/8 R, 81; 165/49, 56, 267–269, 201; 236/1 B, 36, 91 R
IPC ................... F24D 11/00,9/02, 3/12, 3/14, 3/02, F24D 5/08, 5/10, 7/00, 19/10; G05D 23/00
See application file for complete search history.

(56) References Cited

U.S. PATENT DOCUMENTS

| 2,424,305 | A | * | 7/1947 | Davis ............................ 165/255 |
| 2,482,735 | A | * | 9/1949 | Ritter et al. ........................ 237/5 |
| 2,519,266 | A | * | 8/1950 | Main .............................. 237/8 R |
| 3,024,007 | A | * | 3/1962 | Gordon .......................... 165/216 |
| 3,323,580 | A | * | 6/1967 | Werner .................... F24F 3/044 165/217 |
| 3,329,344 | A | * | 7/1967 | Smith, Jr. ....................... 237/8 R |
| 3,498,367 | A | * | 3/1970 | Bohn ............................. 165/265 |
| 3,605,875 | A | * | 9/1971 | McBride, Jr. ................. 165/265 |
| 3,605,876 | A | * | 9/1971 | Squiers ......................... 165/265 |
| 3,897,903 | A | * | 8/1975 | Race ................... F24D 19/1036 236/36 |
| 4,192,455 | A | * | 3/1980 | Rasmussen et al. .......... 237/8 R |
| 4,420,677 | A | * | 12/1983 | Partington .................... 392/358 |
| 4,928,750 | A | | 5/1990 | Nurczyk |
| 5,004,892 | A | * | 4/1991 | Goessler et al. ........... 219/462.1 |
| 5,501,265 | A | | 3/1996 | Bujak, Jr. |
| 5,971,284 | A | * | 10/1999 | Hammer ......................... 236/11 |
| 5,979,781 | A | * | 11/1999 | Fiedrich ........................ 237/8 R |
| 6,062,485 | A | * | 5/2000 | Stege et al. .................... 237/2 A |
| 6,126,081 | A | * | 10/2000 | Calvin et al. ............ 237/12.3 B |
| 6,227,453 | B1 | * | 5/2001 | Calvin et al. .................... 237/69 |
| 6,345,770 | B1 | * | 2/2002 | Simensen ....................... 237/69 |
| 6,427,923 | B1 | * | 8/2002 | Neve et al. .................... 237/2 A |
| 6,454,179 | B1 | * | 9/2002 | Neve et al. .................... 237/2 A |
| 6,474,561 | B2 | * | 11/2002 | Maruyama ...................... 237/70 |
| 6,575,233 | B1 | * | 6/2003 | Krumnow ..................... 165/208 |
| 6,986,469 | B2 | * | 1/2006 | Gauthier ................ F24F 11/006 165/267 |
| 7,044,398 | B2 | * | 5/2006 | Sweet .............................. 237/69 |
| 7,048,200 | B2 | * | 5/2006 | Sweet .............................. 237/69 |
| 7,172,132 | B2 | * | 2/2007 | Proffitt ................... F24F 11/006 165/267 |
| 7,506,617 | B2 | * | 3/2009 | Paine ...................... F23N 1/082 122/448.3 |
| 7,658,335 | B2 | * | 2/2010 | Johnson, Jr. .................. 237/8 R |
| 7,669,775 | B2 | * | 3/2010 | Joergensen et al. .......... 236/1 C |

(Continued)

FOREIGN PATENT DOCUMENTS

DE 3708449 9/1988
EP 1204014 5/2002

(Continued)

OTHER PUBLICATIONS http://translationportal.epo.org, "DE_3708449_A_1_MachTrans" Machine Translation of DE_3708449_A, Sep. 26, 2013, EPO.*
"SE9203705.L.pdf", Drawings & Abstract of SE Patent #9203705 with Google translation, Sep. 12, 1992.*

Primary Examiner — Gregory L Huson
Assistant Examiner — Daniel E Namay
(74) Attorney, Agent, or Firm — Occhiuti & Rohlicek LLP

(57) ABSTRACT

Controlling under surface heating/cooling by supplying liquid to at least two supply loops in an under surface heating/cooling system, and controlling the flow of the liquid on and off such that during the duty cycle the flow is high and between the duty cycles the flow is off. Room temperature is controlled by controlling the percentage of the duty cycles, which percentage is determined on the basis of the heating demand of the rooms. Different loops are controlled such that at least in two different loops the duty cycles start at different moments.

8 Claims, No Drawings

(56) References Cited

U.S. PATENT DOCUMENTS

| | | | |
|---|---|---|---|
| 7,797,084 B2* | 9/2010 | Miwa | G06Q 50/06 165/267 |
| 8,051,903 B2* | 11/2011 | Bauer | 165/201 |
| 8,230,911 B2* | 7/2012 | Seerup et al. | 165/296 |
| 2002/0060251 A1* | 5/2002 | Neve et al. | 237/2 A |
| 2002/0060252 A1* | 5/2002 | Neve et al. | 237/69 |
| 2002/0088867 A1 | 7/2002 | Neve et al. | |
| 2003/0182021 A1 | 9/2003 | Kidder | |
| 2005/0139690 A1* | 6/2005 | Wilnechenko et al. | 237/12 |
| 2006/0016903 A1* | 1/2006 | Sweet | 237/69 |
| 2006/0065754 A1* | 3/2006 | Joergensen et al. | 236/49.3 |
| 2007/0000660 A1 | 1/2007 | Seerup et al. | |
| 2007/0108307 A1* | 5/2007 | Sinclaire | 237/69 |

FOREIGN PATENT DOCUMENTS

| | | | | |
|---|---|---|---|---|
| JP | 56018246 A | * | 2/1981 | |
| JP | 56025633 A | * | 3/1981 | F24F 11/00 |
| JP | 56040036 A | * | 4/1981 | F24F 11/00 |
| JP | 02171530 A | * | 7/1990 | |
| JP | 02195131 A | * | 8/1990 | |
| JP | 02195132 A | * | 8/1990 | |
| JP | 2000121079 | | 4/2000 | |
| JP | 2001004157 | | 1/2001 | |
| JP | 2001004157 A | * | 1/2001 | F24F 3/00 |
| JP | 2004257645 | | 9/2004 | |
| WO | 03/038343 | | 5/2003 | |

\* cited by examiner

CONTROLLING UNDER SURFACE HEATING/COOLING

CROSS-REFERENCE TO RELATED APPLICATIONS

This application is the National Stage of International Application No. PCT/IB2008/054731, filed on Nov. 12, 2008, which claims the priority of Finland Patent Application No. 20070868, filed on Nov. 15, 2007. The contents of both applications are hereby incorporated by reference in their entirety.

The invention relates to a method of controlling under surface heating/cooling.

Further, the invention relates to an arrangement for controlling under surface heating.

Typically, under floor heating is controlled by using control systems that use linear control of the water flow in the loops supplying heating to a specific room. The control system comprises actuators adjusting the flow of water according to various control algorithms. The linear control system algorithms can use parameters, such as water flow, in and/or out-water temperature, specific room step response, measured and target temperature in a specific room, floor temperature in a specific room, etc. in order to adjust, by means of an actuator, a valve that controls the water flow in the supply loop. A small variation in any of the parameters would lead to an adjustment of the valve to optimise the temperature in the specific room. For example, if the in-water temperature slightly decreases, the valve would slightly open to increase the water flow to counter the effects. The above-described control systems have to be rather complicated in order to get the system to work in a reliable manner. Further, an under floor heating system is usually feeding several supply loops and rooms with hot water and therefore the under floor heating control system has several parallel control processes going on but sharing the same supply of hot water. Therefore, there is a very complex dependency between the loops to be taken into account by the under floor heating control system in order to have an accurate control for each supply Loop. A small adjustment of the water flow in one loop would affect all other loops and all other loops would need to be adjusted in order to maintain the balance of the heating system. Typically, also different supply loops have different lengths and therefore they have different pressure drops over the loop. This means that an actuator adjustment of a short loop would redistribute a lot of supply water and would therefore have a large impact on other especially longer supply loops. In theory, this could be solved but the solution would require very complex under floor heating control system algorithms and also more sensors. In order to simplify the under floor heating control system, the under floor heating system is therefore balanced. The balancing is carried out during the installation and configuration of the under floor heating system by reducing the water flow in short supply loops such that they have the same pressure drop as a long supply loop. However, the balancing is quite complex and it is carried out after the system components are delivered from the factory at the installation site and therefore the balancing adds the total cost of the under floor heating system and also results in severe performance impairment if the balancing is not carried out according to instructions. Further, the balancing is typically carried out only once, which means that the solution is static. If, for example, the need of power in one room changes, if e.g. the purpose of use of the room changes, the loops should be balanced again. This re-balancing is very difficult and therefore, in reality, practically nevercarried out. This can lead to a very inefficient system.

In a supply loop the water temperature decreases when the water flows through the supply loop. This fact causes the problem of the floor part close to the inlet being warmer than the floor part close to the outlet. This will be detected as discomfort by the persons walking on the floor even if the room temperature is comfortable. Solutions exist to this problem, and involve installing interlaced supply loops with the intention to mix supply loop sectors. However, interlacing the supply loop complicates the installation and also adds a source of errors. Another solution is to decrease the supply water temperature to guarantee a sufficiently high flow. The supply water temperature is decreased by adding additional mixers. This is performed especially in houses with radiators having a high supply water temperature in combination with under floor heating in stone or concrete floors. The additional mixer increases the hardware and installation cost and also adds a new component, which adds maintenance cost.

A linear control system requires a plurality of sensors and advanced control algorithms. For example, it is difficult to estimate the energy supplied to a specific room without having a temperature and flow sensors in each supply loop outlet due to a variable linear flow of supply water giving a variable non-linear temperature gradient. Also the interference of the supply loops with each other complicates the control algorithms impairing the performance of the under floor heating system.

Instead of adjusting the magnitude of the water flow, it is known to use an on/off water flow control system. In such a system, during a heating cycle, the flow through the loop is at maximum, and on the off-mode, the flow is totally prevented. The maximum flow is determined by flow balancing valves. The length of the heating cycle is only controlled by the room temperature. An uneven room temperature and overshoot of the temperature are problems in this solution. Also in this system, balancing of the system is a problem, which means that different supply loops interfere each other.

The object of the invention is to provide a new method and arrangement for controlling under surface heating/cooling.

In an embodiment, the actuators and/or valves of a supply loop are controlled on and off. The percentage of the duty cycle, i.e. the cycle when the flow in the supply loop is on, is controlled for controlling the room temperature. During the duty cycle, the flow of the liquid is high, which provides a minimal temperature gradient in the supplying liquid or the supply loop. This eliminates the need of an interlaced supply loop installation and also an additional mixer, which is usually required in under floor heating systems in a concrete floors. Also the control algorithms are rather simple since the control method is based on loading supply loops with cooling hot liquid. Yet, it is quite easy to calculate the supply of energy and to estimate the duty cycle required for reaching the said room temperature. Further, in another embodiment, different loops are controlled such that in two different loops the duty cycles start at different moments. In such a case, the interference between these two loops is reduced. Thus, the need of balancing different loops is reduced, which means that the time consuming and training intensive activity, and also a source of error for carrying out the balancing can be reduced.

In an embodiment, the duty cycles are performed at different times at least in two different loops. This eliminates the interference between the two loops.

In another embodiment, duty cycles are performed simultaneously in at least two loops having essentially the same length. Such a solution further simplifies the control algorithm but because the loops are of the same length they do not essentially interfere with each other.

A hydronic under floor heating system distributes the needed heating demand to each room in the building by controlling the hot water flow through a heating loop in the floor. Normally, one loop per room is used but sometimes a large room is split into two or more loops. The controller will act on the information from the room thermostat and accordingly turn the water flow on or off in the floor loop.

The floor loop piping is typically made of e.g. cross-linked polyethylene plastic pipes. These pipes can be used in different types of floor constructions, i.e. both concrete and wooden floors can be heated this way. It is essential that the insulation, under the pipes, in the floor construction is good to avoid the leakage of energy out downwards. The floor loops layout depends on the heat demand for each room.

In a concrete floor, typically 20 mm pipes are used, the pipes being usually attached to the re-enforcing net before the final concrete casting. The recommendation is that the top of the pipes should be 30 to 90 mm below the concrete surface and the pipe loops should be placed at a 300-mm center distance. Concrete conducts heat well, so this layout will lead to an even distribution of the energy and give an even temperature on the floor surface. This building method using concrete and 20 mm pipes is an economical way of building a UFH (under floor heating) system.

Due to the good thermal conduction in concrete, the loop can be fed with low supply temperature, normally below 35 degrees Celsius.

The step response is quite slow due to the large mass of the floor, normally between 8 to 16 h depending on the floor thickness.

In wooden floors there are some different construction techniques available and we can divide them in two main categories: Floor loops inside the floor construction or on top of the floor construction. It is to be noted that all UFH wooden construction techniques use aluminum plates to distribute the heat from the pipes. This compensates for the poor heat conduction in wood. Generally speaking, all "in floor" constructions uses 20 mm pipes and the on floor technique uses 17 mm pipes that are mounted in pre grooved floor-boards.

Due to the poor thermal conduction in a wooden floor, the loops need a higher supply temperature than a concrete floor, normally up to 40 degrees Celsius.

The step response is quicker than for concrete, normally between 4 to 6 h depending on the floor construction.

The previously mentioned systems are primarily installed when the house is built. In addition to these, UFH systems are provided for after installation. This system focuses on a low building height and the ease of handling and uses smaller pipe diameters, and the pipes are mounted in pre-grooved polystyrene floor panels. The supply temperature and step response are quite similar to those of wooden constructions.

The stroke cycle of the actuator is preferably less than 120 seconds. The actuator can be a conventional mechanical piston valve. The actuator can also be, for example, a solenoid valve. When using a solenoid valve the stroke time of the actuator can be very short. Thus, the stroke time of the actuator can be for example in the range of 0.1 to 120 seconds.

In the control system, the term pulse width refers to the on time of the flow i.e. the duty cycle. The minimum pulse width is preferred in order to achieve an efficient heating. However, the minimum pulse width is preferably determined such that during the duty cycle also the longest loop is filled with supply water. The minimum pulse width means that the time frame of the control is quite short, which means high frequency. Preferably, the time frame is smaller than ⅓ of the response time of the floor in the room to be heated. The time frame may vary for example between 5 and 60 minutes. In order to achieve the feature that the duty cycles start at different moments in different loops, the length of the off-times between the duty cycles can be varied using a pattern or randomly. The variation must naturally be carried out within certain limits, such that the percentage of the duty cycles can be kept at a desired value. Another option is to vary the pulse width using a pattern or randomly in a corresponding manner. Yet another option is to use different time frames in different loops. For example, in one loop the time frame can be 29 minutes, in a second loop the time frame can be 30 minutes and in third loop the time frame can be 31 minutes. Of course sometimes the duty cycles start simultaneously in different loops but using at least one of the above-mentioned systems, the duty cycles start at different moments in most cases. Thus, the object is to prevent the duty cycles in different loops from running synchronously.

The percentage of the duty cycle means how long is the on-state of the time frame is. i.e. if the time frame is 10 minutes and the percentage of the duty cycle is 10%, it means that the flow is 1 minute on and 9 minutes off, if the percentage is 50 the flow is 5 minutes on and 5 minutes off and if the percentage of the duty cycle is 90, the flow is 9 minutes on and 1 minute off. If the time frame is short enough, the control can be considered as continuous if the system is slow enough, i.e. the response time of the floor is long.

This specification refers to hydronic under surface heating/cooling. In such a system, liquid is supplied to supply loops for cooling/heating. The liquid can be for example water or any other suitable liquid medium. The liquid may comprise glycol, for example. Under surface heating/cooling means that the supply loops are installed under the floor, for example. The supply loops can also be installed in any other suitable structure. The loops may be installed in the wall or ceiling, for example.

By using the described solution it is possible to reduce the installation time. Further, the system needs less or no set-up during installation or daily usages.

In the described solution automatic balancing is used. This is a feature aimed at eliminating the need of manual balancing and installation. Basically, the idea is to distribute the energy required to each loop by pulse width modulation of the control output. Another way of describing this is that the output power of each loop will be adapted to its length. I.e. a short loop might get 20% at a time and a longer loop 60% at a time. When the short loop is turned off, the heating capacity will be handed over to the long loops. The calculation of the pulse width is carried out dynamically for each loop by calculations based on overshoot. This also gives the system better performance when it is supplied with unnecessary hot water. The algorithm needs some additional rules to prevent the system from being too slow to react to the set point changes. The pulse width will be increased if the set point is increased by for example 2 or more degrees.

Preferably, the maximum on-time is limited to 70% to prevent the loop from taking too much of the flow capacity.

In an embodiment an On/Off control is combined with pulse width modulation per room. The pulse width depends on the response in the room. At the startup the pulse width is preferably always 50%. The time frame for the pulse width can be 30 minutes, for example. It is important to prevent the different channels/loops from running synchronously. Adding a random value of −30 to +30 seconds to the time frame can prevent this. Another possibility is to have a slightly different time frame for each channel/loop. It is enough if the difference is 5 seconds, for example.

The maximum value for the pulse width is 25 minutes and the minimum value is 5 minutes. The resolution can be 1 minute, for example. Preferably, the pulse width modulation counter is reset the by a change of a set point which prevents delays in the system.

A heating cycle is defined as the time between one heating request and the next heating request.

Maximum and minimum room temperatures are monitored and saved during a full heating cycle.

The pulse width is adjusted at timeout, at heat-up modes or after a heating cycle.

The master timeout for pulse width adjustment can be for example 300 minutes.

The control system comprises an appropriate means for performing the desired functions. For example, a channel block calculates the control signal based on the set point, the room temperature and the energy required. The energy is pulse width modulated and the requirement is calculated by measuring the characteristics of the room temperature over time.

One way to describe this is that it is a traditional on/off control width self adjusting gain.

In an embodiment, the pulse width modulation output can be adjusted between 15 to 70% of the duty cycle. The start value is 50%. The maximum and minimum values during an on/off cycle are stored and evaluated and the duty cycle is adjusted if needed.

The pulse width modulation timer is restarted if the set point increases more than 1 degree.

An automapping algorithm finds the correct thermostat for each room. The system will initially use average values for the set point and the room temperature. This will temporarily result in a slightly uneven temperature distribution in the house. Generally, the smaller rooms will be a little warmer than the larger rooms. The house average response time is measured, and this time is used as a base input in a step response algorithm that will be run for each loop. The thermostat is mapped to the correct loop as soon as a match is found. One thermostat can be mapped to more than one loop due to the fact that larger rooms are divided into several loops. The mappings should be stored to a none volatile memory.

The automapping is primarily meant to be used when it is unclear that the thermostats are mapped/linked to the correct loops. It will try to establish new links by a step response sequence. This is a help function normally used by an installer or under the supervision of the support staff. This feature only works if there is a heating demand for the house and the under floor heating is the main heat source, ie stoves, air-air heat pumps etc., will disturb this algorithm.

It should be possible to exclude channels from the test, i.e. channels that are correctly mapped/linked.

When automapping is started, the system will run using average values of room temperatures and set points from all thermostats. This average value is fed to each channel that should be automapped. The heating cycle time for these combined channels is measured. The measuring time is five heating cycles. The step response time base is calculated from an average of the last four heating cycle times divided by 5.

Per physical channel sequence:
1. Wait until the system is in band, i.e. average room temperature is less than one degree from average set point. Wait one time base time and then reduce set point by one degree for all channels.
2. Wait one time base time. Save all room temperatures from thermostats. Then increase the set point for the tested channel with e.g. 3.5 degrees and decrease the set point for all other channels with e.g. 3.5 degrees.
3. Wait one time base time. Then check each minute if any thermostat has increased by more than e.g. 0.5 degrees. If so, this is mapped to the physical channel. The timeout is set to two time base times; if no match is found during this, then give up and move to next step.
4. Restore the set points for all channels.

Repeat the sequence above until all channels are mapped.
Note that one thermostat can be mapped to several physical channels but not the opposite.

The controller should report if the return temperature does not rise when it has opened the actuator. This means that the loop/valve is jammed or the pipe is wrongly connected to the manifold.

Loop sanity check is a help function that the user can activate for monitoring the existing mapping/linking in a background process. It will also check the supply temperature.

It should be possible to exclude channels from the test, i.e. channels that are correctly mapped/linked. It should be possible to adjust the start time, end time, set point reduction and set point increase within limits to be defined later. The values below are default.

Per zone/thermostat sequence:
1. During evening and night, start at 22:00 in the evening, reduce set point for all but the tested zone by e.g. 0.5 degrees. Save the room temperature for the test zone and increase set point with one degree for that zone.
2. Wait until 7:00 next morning. Link is OK if the zone temperature has increased by at least 0.5 degrees for the tested zone.
3. Restore all set points and display test result on display.

The above is repeated for all zones that should be tested. The sequence is then stopped.

It should be possible for the user to manually stop the test sequence.

Supply temperature diagnostic is a help function that the user can activate for checking that the supply temperature is OK.

Monitor that the set point is reached at least once for all zones during 24 h. If not, display warning message that supply temperature and flow, (pump, actuator, valves and piping etc.) should be checked.

Monitor the pulse width output for all channels. If at least one is below 8 and none is higher than 12, then display a warning message that supply temperature is unnecessary high.

It should be possible to set a minimum output level for any zone that is active when the room temperature is above the set point. The range should be between ~5 to ~15% of the output by the following preliminary scheme:

5%=5 minutes on, 95 minutes off
7.5%=5 minutes on, 66 minutes off
10%=5 minutes on, 45 minutes off
12.5%=5 minutes on, 35 minutes off
15%=5 minutes on, 33 minutes off Note that this function should always start with the off time after that the set point has been reached.

This function is aimed at increasing the comfort in bathrooms and at preventing the floor from being cold if you occasionally use a fireplace to heat up the room.

In some cases, the features described in this description can be used as such, irrespective of other features. Then again, the features described in this description may, if necessary, be combined in order to form different combinations.

It is obvious to those skilled in the art that in the course of technical progress, the basic idea of the invention can be carried out in numerous ways. Thus, the invention and its embodiments are not limited to the previous examples but they may vary within the scope of the appended claims.

The invention claimed is:

1. A method of controlling under surface heating/cooling, the method comprising
    supplying liquid to at least two supply loops in an under surface heating/cooling system, and
    controlling the flow of the liquid on and off such that during a duty cycle the flow is high and between the duty cycles the flow is off
    whereby
    room temperature is controlled by controlling a ratio of the duty cycle to a control time frame, the ratio being determined on the basis of the heating demand of the rooms, and each of the at least two supply loops is controlled such that a maximum ratio of the duty cycle to the control time frame is limited to 70%.

2. A method according to claim 1, wherein
    at least in two different loops the duty cycles are performed at different times.

3. A method according to claim 2, wherein
    at least in two different loops having essentially the same length the duty cycles are performed simultaneously.

4. A method according to claim 2, wherein
    the duty cycle is significantly shorter than the overall time constant of the heating step response of the floor and room.

5. A method according to claim 1, wherein
    at least in two different loops having essentially the same length the duty cycles are performed simultaneously.

6. A method according to claim 5, wherein
    the duty cycle is significantly shorter than the overall time constant of the heating step response of the floor and room.

7. A method according to claim 1, wherein
    the duty cycle is significantly shorter than the overall time constant of the heating step response of the floor and room.

8. The method of claim 1 wherein each of the at least two loops is controlled such that a minimum ratio of the duty cycle to the control time frame is limited to 15%.

* * * * *